United States Patent
Schmitt et al.

(10) Patent No.: US 7,610,016 B2
(45) Date of Patent: Oct. 27, 2009

(54) SYSTEM AND METHOD FOR PROVIDING AN ADAPTER MODULE

(75) Inventors: Edward D. Schmitt, Gresham, OR (US); Ibrahim Mohamed, Bothell, WA (US); Thomas Edwin East Nelson, Sammamish, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 11/051,493

(22) Filed: Feb. 4, 2005

(65) Prior Publication Data
US 2005/0202853 A1   Sep. 15, 2005

Related U.S. Application Data

(63) Continuation of application No. 10/036,109, filed on Dec. 31, 2001, now Pat. No. 6,892,051.

(60) Provisional application No. 60/300,842, filed on Jun. 25, 2001.

(51) Int. Cl.
H04B 7/00   (2006.01)

(52) U.S. Cl. .................. 455/41.2; 455/90.3; 455/575.9; 455/569.1; 455/569.2; 455/575.6; 455/575.1; 455/557; 455/345; 455/563; 379/430; 379/420.01

(58) Field of Classification Search ................ 455/41.2, 455/90.3, 575.9, 569.1, 569.2, 575.6, 563, 455/557, 566, 345
See application file for complete search history.

(56) References Cited

U.S. PATENT DOCUMENTS

| 5,303,299 A | 4/1994 | Hunt et al. |
| 5,325,421 A | 6/1994 | Hou et al. |
| 5,479,479 A | 12/1995 | Braitberg et al. |
| 5,535,274 A | 7/1996 | Braitberg et al. |
| 5,546,458 A | 8/1996 | Iwami |
| 5,590,414 A | 12/1996 | Marui et al. |
| 5,638,436 A | 6/1997 | Hamilton et al. |

(Continued)

FOREIGN PATENT DOCUMENTS

EP   0 920 170   6/1999

(Continued)

OTHER PUBLICATIONS

Krebs, Michelle, "Digital Link for Car Talk,", From Escapes/Bells and Whistles, Sep. 6, 2002, p. 1, The New York Times Website, Automobiles.

*Primary Examiner*—Marceau Milord
(74) *Attorney, Agent, or Firm*—Parks IP Law LLC

(57) ABSTRACT

Embodiments include a system and method for adapting a wireless device, such as a Bluetooth-enabled mobile handset or other Bluetooth-enabled device to a car radio and associated speaker system to effect a hands-free car kit or similar system. The adapter module is physically and electrically coupled to the car radio by making electrical contact with a connector on the car radio with a matching connector on one side of the adapter module. The mated connectors provide communications from the adapter module to the car radio. The adapter module includes circuitry for communicating with the Bluetooth-enabled mobile handset and the car radio in order to exchange communications signals between the Bluetooth-enabled mobile handset, and a microphone and the car radio.

15 Claims, 3 Drawing Sheets

U.S. PATENT DOCUMENTS

| | | | |
|---|---|---|---|
| 5,652,789 | A | 7/1997 | Miner et al. |
| 5,653,336 | A | 8/1997 | Buonaiuto et al. |
| 5,848,130 | A | 12/1998 | Rochkind |
| 5,857,013 | A | 1/1999 | Yue et al. |
| 6,052,603 | A | 4/2000 | Kinzalow et al. |
| 6,058,319 | A | 5/2000 | Sadler |
| 6,073,103 | A | 6/2000 | Dunn et al. |
| 6,075,999 | A | 6/2000 | Vilmi et al. |
| 6,078,825 | A | 6/2000 | Hahn et al. |
| 6,088,428 | A | 7/2000 | Trandal et al. |
| 6,101,403 | A | 8/2000 | Masuda |
| 6,131,042 | A | 10/2000 | Lee et al. |
| 6,138,041 | A | 10/2000 | Yahia |
| 6,154,663 | A | 11/2000 | Itamochi |
| 6,163,690 | A | 12/2000 | Lilja |
| 6,163,711 | A | 12/2000 | Juntunen et al. |
| 6,173,056 | B1 | 1/2001 | Romesburg et al. |
| 6,184,651 | B1 | 2/2001 | Fernandez et al. |
| 6,195,572 | B1 | 2/2001 | Patterson et al. |
| 6,217,351 | B1 | 4/2001 | Fung et al. |
| 6,230,029 | B1 | 5/2001 | Hahn et al. |
| 6,246,211 | B1 | 6/2001 | Dalton et al. |
| 6,255,800 | B1 * | 7/2001 | Bork ............................ 320/115 |
| 6,266,544 | B1 * | 7/2001 | Tomura et al. ............... 455/572 |
| 6,282,268 | B1 | 8/2001 | Hughes et al. |
| 6,304,764 | B1 * | 10/2001 | Pan ........................... 455/569.2 |
| 6,314,166 | B1 | 11/2001 | Laurila et al. |
| 6,339,696 | B1 | 1/2002 | Chan et al. |
| 6,341,218 | B1 | 1/2002 | Poplawsky et al. |
| 6,349,223 | B1 | 2/2002 | Chen |
| 6,377,825 | B1 | 4/2002 | Kennedy et al. |
| 6,397,086 | B1 | 5/2002 | Chen |
| 6,400,806 | B1 | 6/2002 | Uppaluru |
| 6,459,882 | B1 | 10/2002 | Palermo et al. |
| 6,501,966 | B1 | 12/2002 | Bareis et al. |
| 6,526,292 | B1 | 2/2003 | Henry, Jr. |
| 6,539,359 | B1 | 3/2003 | Ladd |
| 6,542,758 | B1 | 4/2003 | Chennakeshu et al. |
| 6,553,024 | B1 | 4/2003 | Hunlich et al. |
| 6,570,964 | B1 | 5/2003 | Murveit et al. |
| 6,601,031 | B1 | 7/2003 | O'Brien |
| 6,636,749 | B2 | 10/2003 | Holmes et al. |
| 6,687,517 | B2 | 2/2004 | Kinnunen |
| 6,697,638 | B1 | 2/2004 | Larsson et al. |
| 6,889,065 | B2 | 5/2005 | Holmes et al. |
| 6,892,051 | B2 * | 5/2005 | Schmitt et al. ............. 455/41.2 |
| 2001/0049262 | A1 | 12/2001 | Lehtonen |
| 2002/0032042 | A1 | 3/2002 | Poplawsky et al. |
| 2002/0090066 | A1 | 7/2002 | Gupta et al. |
| 2003/0021394 | A1 | 1/2003 | Krack |
| 2003/0063717 | A1 | 4/2003 | Holmes et al. |
| 2003/0190020 | A1 | 10/2003 | Kitchings |
| 2004/0062365 | A1 | 4/2004 | Agraharam et al. |

FOREIGN PATENT DOCUMENTS

| | | |
|---|---|---|
| EP | 1 107 546 | 6/2001 |
| WO | WO-99/45687 | 9/1999 |
| WO | WO-99/45691 | 9/1999 |

* cited by examiner

SYSTEM AND METHOD FOR PROVIDING AN ADAPTER MODULE

CROSS-REFERENCE TO RELATED APPLICATION(S)

This application is a continuation of U.S. patent application Ser. No. 10/036,109, filed Dec. 31, 2001 now U.S. Pat. No. 6,892,051, which claims the benefit of U.S. Provisional Patent Application No. 60/300,842, filed Jun. 25, 2001.

TECHNICAL FIELD

Embodiments of the present invention relate generally to adapters for coupling to wireless communicating devices.

BACKGROUND

In order to participate in wireless telecommunications more easily while driving, many drivers have endured considerable expense in terms of time, money and effort, to have a hands-free car kit professionally installed in their vehicles. The primary advantage to the hands-free car kit is that users can carry on a conversation without having to hold a mobile handset to their ear. This frees up the hand that otherwise would have been holding the handset to perform other tasks, such as driving the car. The hands-free car kit may even provide other advantages such as superior reception and sound quality as compared to the handset alone.

In a typical usage scenario, the user dials a phone number on their mobile handset to place a call, or receives a call from another user. The user places the handset into a special cradle which has been customized for physically holding that handset and for providing electrical connections to a microphone, speakers and possibly an antenna, as may be associated with the hands-free car kit. In many cases, the cradle and related electrical connections are adapted to only one handset model or a small number of closely related handsets. The very limited number of phones that a hands-free car kit can work with becomes a problem when the user desires to change to a new or different mobile phone handset. The user may want to change their handset because it offers better features, is associated with a different wireless service provider desired by the user or for any other reason.

Newer phones have historically been smaller and differently shaped than existing phones, again giving rise to incompatibility with previously installed hands-free car kits. Other concurrently offered mobile handsets tend to have different physical and electrical characteristics. Previously installed hands-free car kits can be replaced with newer or different hands-free car kits associated with a replacement handset. Unfortunately, replacement of the existing hands-free car kit would involve considerable expense in terms of time, money and effort, not only to install the replacement hands-free car kit, but to remove the existing hands-free car kit. It would be desirable to be able to reduce the time, money and/or effort associated with replacing a previously installed hands-free car kit when the user replaces the handset matching the existing hands-free car kit with a newer or different handset that is substantially incompatible the existing hands-free car kit.

Figure 1:
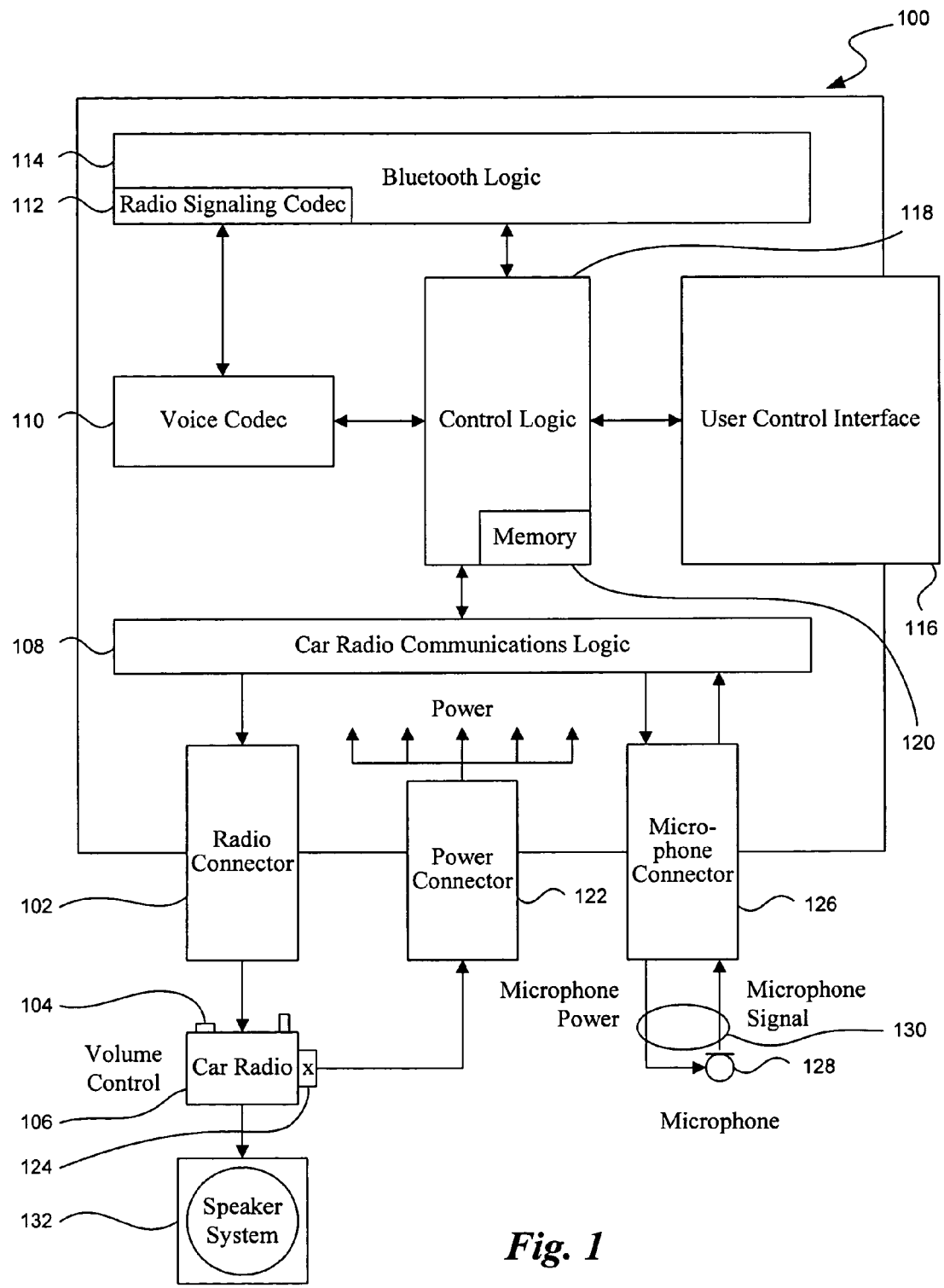
FIG. 1 shows a block diagram of the adapter module where in one embodiment of the present invention the adapter module is adapted to communicate with a modified car radio, and a Bluetooth-enabled mobile handset substantially according to the Bluetooth specification.

In the drawings, the same reference numbers identify identical or substantially similar elements or acts. To easily identify the discussion of any particular element or act, the most significant digit or digits in a reference number refer to the Figure number in which that element is first introduced, e.g., element 102 is first introduced and discussed with respect to FIG. 1.

Note that the headings provided herein are for convenience and do not necessarily affect the scope or interpretation of the invention.

DETAILED DESCRIPTION

Aspects of the present invention overcome many of the limitations described in prior and current hands-free car kits and provide additional benefits by creating a unique adapter for implementing a new hands-free car kit using a Bluetooth-enabled adapter module to support Bluetooth-enabled mobile handsets in combination with an existing car radio that supports cell phone voice with a built-in car cell phone or with a standard car radio when using the addition of a module supported microphone. The adapter module establishes a communications link with a Bluetooth-enabled mobile handset or the like, using communications protocols established under the Bluetooth standard.

In one embodiment an adapter module is used to create a hands-free car kit. The adapter module has a auxiliary radio connector and a power connector which couple with a corresponding adapter module connector on a existing/modified car radio. In an alternative embodiment, the radio connector and the power connector are combined. The adapter module is physically configured so that it can be connected to, and supported by, the existing/modified car radio. The mated connectors provide power to the adapter module and unidirectional communications from the adapter module to the existing/modified car radio to form a hands-free car kit. In one embodiment the adapter module contains a microphone connector for providing power to and receiving audio signals from a microphone attached to the microphone connector. From the perspective of the modified car radio, the adapter module emulates the communication style of a compatible audio device, e.g., a radio or compact disk player (known as a "CD player").

The adapter module contains a Bluetooth chip or chipset for communicating with a Bluetooth-enabled mobile handset. A "handset" is defined herein to include any Bluetooth-enabled device used for communications or data processing. The Bluetooth-enabled mobile handset may have an integrated Bluetooth capability added during manufacture or may be upgraded to contain the Bluetooth capability after manufacture. In any case, the adapter module exchanges digitized audio information, such as digitized spoken words, with the Bluetooth-enabled mobile handset, thereby allowing users to carry on a conversation with a remote user via the hands-free car kit created by the adapter module and their Bluetooth-enabled mobile handset.

Embodiments of the present invention described herein provide an adapter module for adapting a car radio modified to accept an adapter module for communications with a Bluetooth-enabled mobile handset, thereby allowing all Bluetooth-enabled mobile handsets to utilize this hands-free car kit. Presently available hands-free car kits only work with a very limited number of mobile handsets. The present invention creates a hands-free car kit that works with any Bluetooth-enabled mobile handset, significantly mitigating the associated costs of acquiring a compatible hands-free car kit in terms of time, money and effort with upgrading to any Bluetooth-enabled phone. Once an embodiment of the present invention is installed with a modified car radio, any number of future substitutions of different Bluetooth-enabled mobile handsets will incur no additional cost regarding the hands-free car kit, because the hands-free car kit in combination with the modified car radio is compatible with all such Bluetooth-enabled mobile handsets and other such Bluetooth-enabled devices, to the extent they operate on a compatible Bluetooth standard. Embodiments of the present invention thereby make it easier for a user to upgrade as often as they choose to better Bluetooth-enabled mobile handsets, or change to more cost-effective Bluetooth-enabled mobile handsets.

"Bluetooth" refers to a specification designed to standardize wireless transmission between a wide variety of devices, such as personal computers ("PCs"), cordless telephones, headsets, printers, personal digital assistants ("PDAs"), etc. Bluetooth acts as a "virtual cable," whereby a computer can automatically use a mobile telecommunications device (such as a mobile cell phone) to send data wirelessly, such as exchange e-mail, transmit data to a fax machine, etc. Under the Bluetooth specification, Bluetooth devices will operate in a part of the electromagnetic spectrum that in most countries, including the United States, have agreed will remain unlicensed. The Bluetooth transceiver operates in the 2.4 GHz ISM band. The Bluetooth spectrum ranges from 2.4000 GHz to 2.4835 GHz, thus yielding 83.5 MHz of allocated bandwidth which includes a 2 MHz lower guardband, a 3.5 MHz upper guard band and 78 1 MHz channels in the available 78 MHz between the guardbands for communications. Bluetooth operates using frequency hopping spread spectrum, where data packets are spread across the Bluetooth Spectrum at a nominal rate of 1,600 hops per second to lessen interference and fading. According to the Bluetooth specification, Bluetooth devices are slated to operate their antennas, for example having zero directional gain, at one of three different maximum antenna power levels, i.e., 1 mW, 2.5 mW and 100 mW. The nominal link range is 10 meters, and the gross data rate is 10 Mbps, although increases may be possible. Bluetooth can support both synchronous connection oriented (SCO) links for voice and asynchronous connectionless (ACL) links for packet data. Generally speaking, Bluetooth communications are not directly compatible with most mobile wireless handset telephones in use today, many of which operate on code division multiple access (known as "CDMA") or time division multiple access (known as "TDMA") principles that employ different signaling protocols on different frequencies.

Details on Bluetooth may be found at http://www.Bluetooth.com, http://www.palowireless.com, "Bluetooth Revealed", Miller & Bisdikian, Prentice Hall PTR, 2001, and "Bluetooth Demystified", Muller, McGraw-Hill, 2001, and in particular, "Specification of the Bluetooth System," version 1.1: http://www.Bluetooth.com/developer/specification/specification.asp.

The following description provides specific details for a thorough understanding of, and enabling description for embodiments of the invention. However, one skilled in the art will understand that the invention may be practiced without these details. In other instances, well known structures and functions have not been shown or described in detail to avoid unnecessarily obscuring the description of the embodiments of the invention. While aspects of the invention are described herein as employing the Bluetooth protocol, those skilled in the relevant art will recognize that aspects of the invention are equally applicable with other communication protocols and standards, including those encompassing other short range wireless networks such as IEEE 802.11, contactless smart cards, IrDA standards, Home RF, etc.

Turning to FIG. 1, an adapter module 100 is shown. The adapter module 100 contains a radio connector 102 for physically and electrically mating with a corresponding adapter module connector 104 in a modified car radio 106. The adapter module connector 104 is not restricted to placement on any particular portion of the car radio. The adapter module connector 104 may be positioned on a side of the car radio proximal to the user (such as the front for easy user connectability), distal to the user (such as on the back and in the dash for a less cluttered front appearance), or any other side. In an alternative embodiment the adapter module 104 is inserted into the car radio. In another alternative embodiment, the adapter module 104 is connected to car components behind the dash which integrate with an audio IN/OUT of the car for interaction with various in-car systems. In yet another alternative embodiment, the adapter module 104 is integrated into the main connection point for all in-car systems i.e. a wiring harness. Note that the present invention is not limited to electrical communications; other forms of communications, such as optical communications are also envisioned. The radio connector 102 is also connected to car radio communications logic 108. The car radio communications logic 108 contains circuitry for receiving digitized voice signals and transmitting digitized or analog voice signals, depending on the type of car radio being used, to the modified car radio 106 through the mated radio connector 102 and adapter module connector 104.

The car radio communications logic 108 is adapted for communication with a particular car radio or set of car radios. The number of different adapter modules 100 corresponds to the number of different car radio communication styles. The car radio communications logic 108 exchanges voice signals with voice codec logic 110 which converts the voice signals into an encoded speech format for exchange with a radio signaling codec 112 portion of Bluetooth logic 114. In one embodiment, the voice codec logic 110 converts outgoing analog voice signals into a digital form before converting them into an encoded speech format. The radio signaling codec 112 exchanges the voice signals with the voice codec logic 110 and Bluetooth logic 114. The radio signaling codec 112 exchanges a bit stream of digitized voice signals with the Bluetooth logic 114.

Analogous to the car radio communications logic 108, the Bluetooth logic 114 contains circuitry for wirelessly exchanging digitized voice signals with an external device, e.g., the Bluetooth-enabled mobile handset, substantially according to the Bluetooth specification. The Bluetooth logic 114 may perform encryption and decryption of the voice signals under the Bluetooth specification for wireless communications. The Bluetooth logic 114 is operatively connected to an antenna suitable for communications under Bluetooth specification that may be internal or external to the adapter module. Bluetooth chips and/or chipsets are expected to be available in commercial quantities from Ericsson (Sweden), Motorola (Illinois), and Nokia (Finland), among others. The car radio communications logic 108, the voice codec logic 110, the radio signaling codec 112, the Bluetooth logic 114 and a user control interface 116 are connected to and controlled by control logic 118. The control logic 118 includes a central processing unit (known as a "CPU") and memory 120, which in one embodiment is flash memory. The user control interface 116 includes buttons, LEDs and associated drivers and logic to receive input from the user and display status conditions back to the user, in general, to provide the interface between the user and the adapter module 100. For example, the user control interface 116 indicates successful adapter module 100 and hands-free car kit mating, power on-off and the establishment of communications with a Bluetooth-enabled mobile handset or other device. In one embodiment the user control interface 116 is hidden behind or under a vehicle dashboard.

The adapter module 100 receives its electrical power through a power connector 122. The power connector is connected to an electrical power source made available from a car radio power connector 124 added to the modified radio 106 (or provided elsewhere in the car, such as via a cigarette lighter socket). Electrical power received from the modified car radio 106 through mated or coupled radio power connector 124 and the power connector 122 is distributed within the adapter module 100 to where electrical power is needed inside the adapter module 100. The adapter module 100 contains a microphone connector 126 for electrically coupling with an external microphone 128. Electrical power passes through the microphone connector through a microphone cable 130 to the microphone 128 and voice signals are returned back from the microphone 128 through the microphone cable 130 and through the microphone connector 126 to the car radio communications logic 108. The microphone 128 may be mounted on a dashboard, near a visor or in any other convenient places in the user's car.

Voice signals from a remote user are transmitted from the modified car radio 106 to a speaker system for the audio output to the user, as explained below. In another embodiment, the adapter module 100 is not limited to voice signals, but is adapted to exchange voice and/or data signals, e.g., for exchanging data with other parts or contents of the vehicle capable of exchanging data.

The user, or others, can easily install the adapter module 100 into the modified car radio 106 by bringing the adapter module 100 into proximity with the modified car radio 106 with the radio connector 102 facing the adapter module connector 104 and pushing the adapter module 100 closer to the modified car radio 106 until a physical and electrical connection between the connectors 102, 104 is made, resulting in the connectors 102, 204 being mated. The adapter module connector 102 is brought into alignment with the adapter module connector 104 in order for mating to occur.

The present invention is not limited to any one particular embodiment for ensuring that the connectors 102, 104 are properly aligned in order to be mated. For example, the adapter module 100 may be physically keyed so that misorientation is not possible, likewise, the connectors 102, 104 may also be keyed. The connectors may also be made symmetrical so orientation is less important. Markings can be placed on the surface of the adapter module 100, and corresponding instructions included in an accompanying manual, to guide the user in making a proper connection. In one embodiment one or more small lights, such as an light emitting diode (known as an "LED") is controlled by the user control interface 116 in the adapter module 100 and placed on a surface of the adapter module 100 facing the interior of the vehicle. One of the small lights indicates that a proper connection has been made and the setup is working. Another small light indicates that communications between the adapter module 200 and a Bluetooth-enabled device has been established.

By way of example, in one embodiment, a user driving her vehicle may make a phone call to or accept a phone call from a friend on the user's Bluetooth-enabled mobile telephone handset. The user's voice response is picked up by the microphone 128 and operatively coupled to the adapter module 100. The microphone 128 transmits the voice signals through the microphone cable 130 and connector 126 to the car radio communications logic 108. The car radio communications logic 108 passes the digitized voice signals to the voice codec logic 110, which in turn creates encoded speech with the voice signals, and passes the voice signals to the radio signaling codec 112 portion of the Bluetooth logic 114. The radio signaling codec 112 translates the encoded voice signals into a bit stream representation and sends the voice signals to the Bluetooth logic 114 under control of the control logic 118. The Bluetooth logic 114 takes the digitized voice signals and passes them wirelessly, and substantially according to the Bluetooth specification, to the user's Bluetooth-enabled handset, which transmits the digitized voice signals to the user's friend via the wireless and possibly other networks to the friend's telephone.

The friend vocally responds to the user and the friend's voice is transmitted to the user's Bluetooth-enabled mobile handset. The Bluetooth-enabled mobile handset passes the friend's digitized voice signals to the Bluetooth logic 114 in the adapter module 100 substantially according to the Bluetooth specification. The Bluetooth logic 114 passes the digitized voice signals to the radio signaling codec 112 portion of the Bluetooth logic 114 in a bit stream format. The radio signaling codec 112 transforms the voice signal bit stream into an encoded voice signal format passes the voice signals to the voice codec 110. The voice codec receives the encoded voice signals and translates those signals into an analog or digital format as may be compatible with the modified car radio 106 and transmits the audio signals to the car radio communications logic 108. In one embodiment, the car radio communications logic 108 transmits the digitized voice signals through the radio connector 102 in the format expected by the modified car radio 106. The modified car radio 106 transmits the voice signals to the speaker system 132 to enable to hear the friend.

Figure 2:
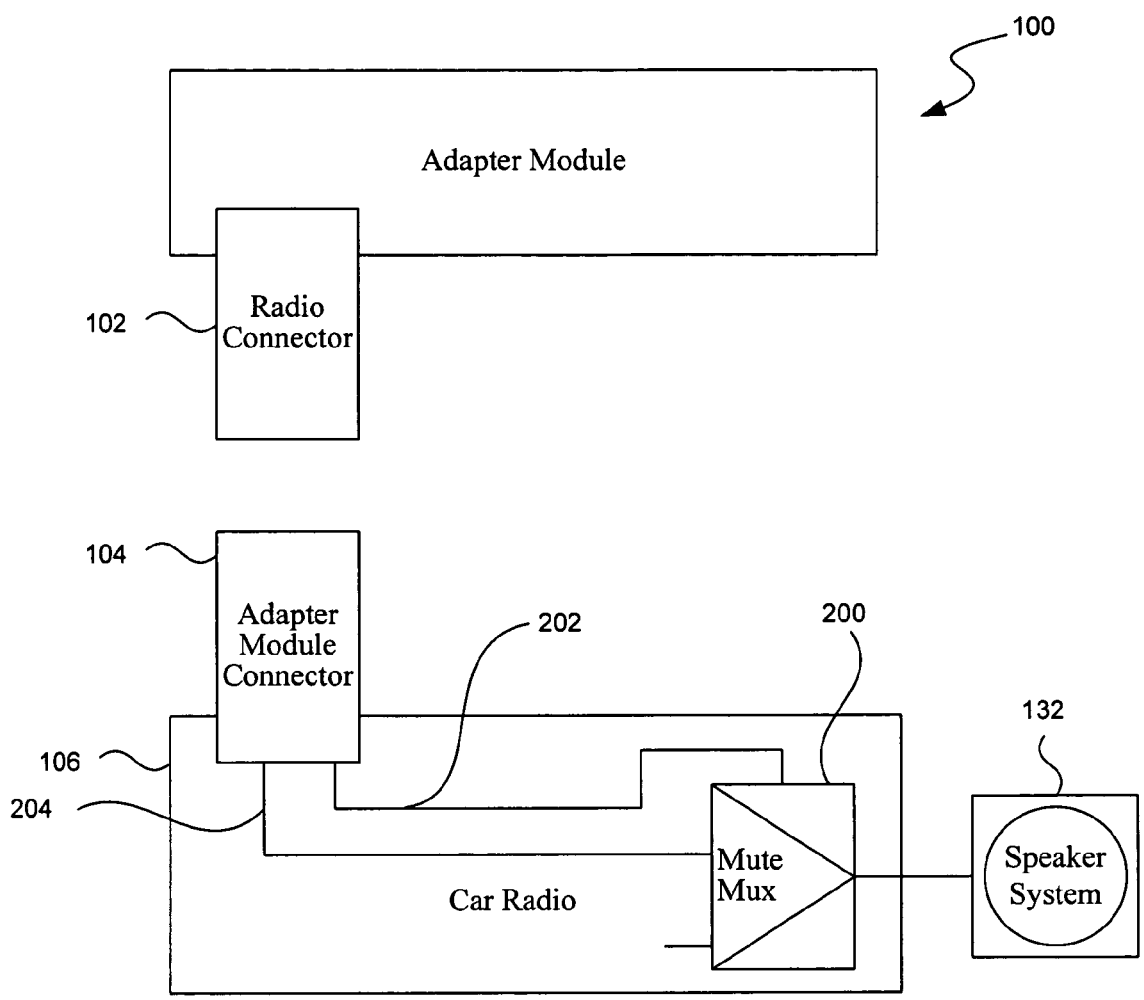
FIG. 2 shows a block diagram of the adapter module and portions of a modified car radio and electrically coupled speakers where in one embodiment of the present invention the adapter module is adapted to communicate with a modified car radio, and a Bluetooth-enabled mobile handset substantially according to the Bluetooth specification.

In one embodiment of the present invention illustrated in FIG. 2, an adapter module 100 is shown. As described herein, the adapter module 100 contains the radio connector 102 for physically and electrically mating with a corresponding adapter module connector 104 in the modified car radio 106. Signals are transmitted in a unidirectional fashion from the adapter module 100 to the modified car radio 106 via the mated connectors 102, 104. The modified car radio 106 is modified from some other car radios in the sense that the adapter module connector 102 has been added to the modified car radio 106. In one embodiment, the modified car radio 106 also includes a radio power connector 124 for transmitting electrical power to the adapter module 100. In another embodiment, the adapter module 100 receives its electrical power from elsewhere in the vehicle. A mute mux 200 is included in the modified car radio 106. The mute mux 200 is a multiplexer capable of being controlled by a mux control signal over a control line 202. In one embodiment the mux control signal is transmitted from the control logic 118 in the adapter module 100 over the control line 202. The mux control signal causes the car radio 106 to transmit voice signals from the adapter module 100 to the speaker system 132 by switching the mute mux output from a car radio 106 audio output to the adapter module 100 audio output. In this fashion the adapter module 100 controls the audio output of the modified car radio 106 and the speaker system 132 to switch from, e.g. outputting music to outputting the friend's conversation, and thereby create a hands-free car kit compatible with Bluetooth-enabled devices.

Figure 3:
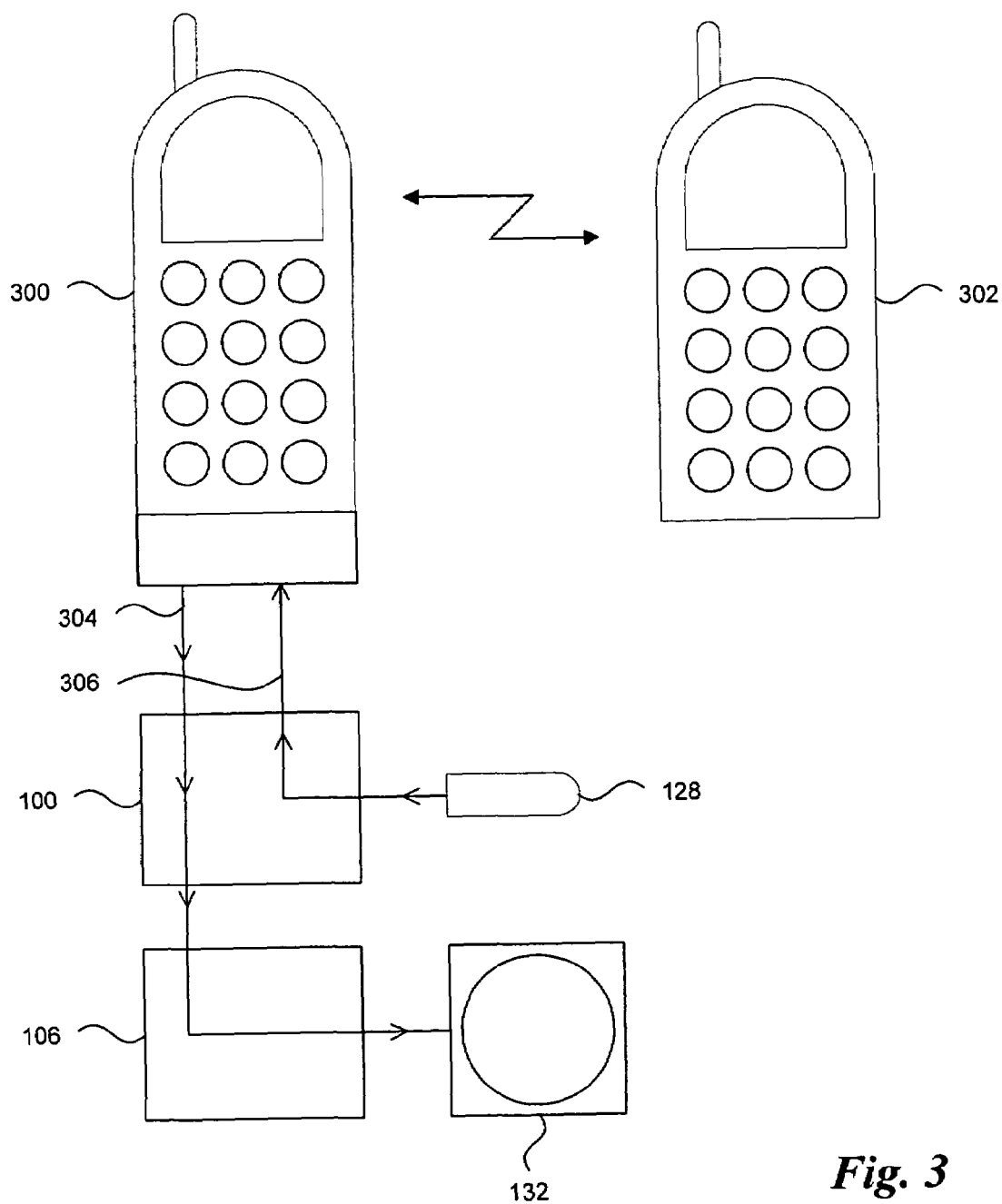
FIG. 3 shows a block diagram illustrating flows of voice signals, an adapter module, portions of a modified car radio and electrically coupled speakers and two mobile wireless handsets where in one embodiment of the present invention the adapter module is adapted to communicate with a modified car radio, and a Bluetooth-enabled mobile handset substantially according to the Bluetooth specification.

An illustrative view of the paths taken by the voice signals in one embodiment of the present invention is shown in FIG. 3. In FIG. 3, the user's Bluetooth-enabled handset 300 is engaged in wireless communications with a remote handset 302, which may or may not be Blue-tooth enabled. Voice signals received by the user's handset 300 take a first path 304, while voice signals generated by the user take a second path. For example, signals transmitted by the remote handset 302 are received by the user's Bluetooth-enabled handset 300 and transmitted through the adapter module 100 as described herein to the modified car radio 106 and finally to the speaker system 132 for audio output to the user. Voice signals generated by the user are received by the microphone 128 and transmitted through the adapter module 100 as described herein to the user's Bluetooth-enabled handset 302. The user's Bluetooth-enabled handset 302 transmits the voice signals to the remote user's handset 302 for audio reproduction to the remote user. Thus described herein is a system and method enabling the user to employ their Bluetooth-enabled mobile wireless handset 300 in a hands-free manner in a vehicle for communication with a remote user. In another embodiment, control signals are transmitted to the car radio 106 to control various functions in the car radio 106 in addition to the mute mux 200.

The advantages of the present invention combine to overcome or mitigate a number of shortcomings of prior hands-free car kits as well as provide additional benefits. For example, embodiments of the present invention overcome the problem of users trying to hold their wireless handsets while driving, without installing a current hands-free car kit. This allows any Bluetooth-enabled handset to communicate through the adapter module to the vehicle's speaker system. Embodiments of the present invention mitigate the problem of the associated time, money and effort required associated with replacing incompatible hands-free car kits by providing an adapter module for a modified car radio to create a hands-free car kit so it no longer requires replacement for Bluetooth-enabled devices each time they have acquired, or wish to acquire, a new Bluetooth-enabled mobile handset, by giving such incompatible car kits a Bluetooth communications capability with the adapter module. In one embodiment it is expected that users could quickly and easily install the adapter module by connecting it into modified car radio. It is also expected that the adapter module will be considerably less expensive than replacing a hands-free car kit, thereby reducing the amount of time, money and effort required to gain a compatible hands-free car kit for their Bluetooth-enabled handset.

Those skilled in the relevant art will appreciate that while adapter modules are described herein in combination with Bluetooth communications, the invention may employ any wireless communication standard or device. Such a standard or device may have less functionality and be cheaper to implement than the described adapter module. Aspects of the invention can be embodied in a special purpose computer or data processor that is specifically programmed, configured, or constructed to perform one or more of the computer-executable instructions explained in detail herein. Indeed, the term "adapter module", as used generally herein, refers to any of the above devices, as well as to any data processor. The terms "car radio" or "modified car radio" apply to any audio device attached to a vehicle for carrying people. Data structures and transmission of data particular to aspects of the invention are also encompassed within the scope of the invention. In general, while hardware platforms such as stationary and mobile devices are described herein, aspects of the invention are equally applicable to nodes on the network having corresponding resource locators to identify such nodes.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above", "below," and words of similar import, when used in this application, shall refer to this application as a whole and not to any particular portions of this application.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. The teachings of the invention provided herein can be applied to other systems, not necessarily the system described herein. The various embodiments described herein can be combined to provide further embodiments. These and other changes can be made to the invention in light of the detailed description.

All of the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

Incorporated by reference herein are all above references, patents, or applications and the following U.S. patent applications, which are assigned to the assignee of this application: patent application Ser. No. 11/058,103, entitled, Apparatus For Providing Power And Wireless Protocol Capability To A Mobile Device, Such As A Wireless Phone, filed Dec. 13, 2001 and patent application Ser. No. 11/051,493, entitled, System and Method For Providing An Adapter Module, filed Dec. 13, 2001.

We claim:

1. An adapter module for use with a Bluetooth-enabled wireless handset and a car radio, comprising:

Bluetooth logic substantially compatible with at least one Bluetooth standard to wirelessly exchange communication signals with the Bluetooth-enabled wireless handset;

car radio communications logic substantially compatible with the car radio to transmit communication signals to the car radio, wherein the Bluetooth logic is communicatively coupled to the car radio communications logic to exchange communication signals, and wherein the Bluetooth logic and car radio communications logic are configured to permit hands-free communications with the Bluetooth-enabled wireless handset.

2. The adapter module of claim 1, further comprising:

a user control interface, the user control interface controlling at least one LED to indicate a state of the adapter module; and control logic, the control logic having memory and being communicatively coupled to the Bluetooth logic, the car radio communications logic and the user control interface;

wherein the control logic provides control signals to the Bluetooth logic and the car radio communications logic to control the exchange of communication signals between the Bluetooth-enabled wireless handset and the car radio.

3. An adapter module for use with a wireless device and an audio stereo system of an automobile, comprising:

wireless communications logic, the wireless communications logic being substantially compatible with the wireless device to exchange communication signals with the wireless device; and automobile audio communications logic, the automobile audio communications logic being configured to be substantially compatible with the automobile audio stereo system to transmit signals to the automobile audio stereo system, the automobile audio communications logic being operatively coupled to the wireless communications logic to receive communication signals from the wireless communications logic.

4. The system of claim 3 wherein the wireless device communicates substantially according to IEEE 802.11.

5. The system of claim 3 wherein the wireless device communicates substantially according to a Bluetooth standard.

6. The system of claim 3 wherein the wireless device communicates substantially as a short range wireless network.

7. The system of claim 3 wherein the wireless device communicates substantially according to at least one standard associated with contactless smart cards.

8. The system of claim 3 wherein the wireless device communicates substantially according to at least one IrDA standard.

9. The system of claim 3 wherein the wireless device communicates substantially according to a Home RF standard.

10. A method of adapting a car radio for communications with a wireless handset, comprising:

receiving communication signals from the wireless handset;

converting the communication signals from a first form used by the handset to a second form used by the car radio; and wirelessly transmitting the communications signals in the second form to the car radio under a short range wireless communication protocol.

11. The method of claim 10 wherein the communication signals from the wireless handset are received substantially according to IEEE 802.11.

12. The method of claim 10 wherein the communication signals from the wireless handset are received substantially according to a Bluetooth standard.

13. The method of claim 10 wherein the communication signals from the wireless handset are received substantially according to at least one IrDA standard.

14. The method of claim 10 wherein the communication signals derived from the wireless handset are received substantially according to a Home RF standard.

15. The method of claim 10 wherein the communication signals derived from the wireless handset are received substantially according to at least one standard associated with contactless smart cards.

* * * * *